(12) United States Patent
McDonald et al.

(10) Patent No.: US 6,892,376 B2
(45) Date of Patent: May 10, 2005

(54) FLEXIBLE INFRASTRUCTURE FOR MANAGING A PROCESS

(75) Inventors: John T. McDonald, Woodbridge, CT (US); Philip E. Petherbridge, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 09/814,043

(22) Filed: Mar. 20, 2001

(65) Prior Publication Data

US 2004/0015818 A1 Jan. 22, 2004

(51) Int. Cl.$^7$ ............................................... G06F 9/44
(52) U.S. Cl. ........................... 717/103; 705/8; 709/201
(58) Field of Search ................................. 717/103, 101; 705/8, 9; 709/201

(56) References Cited

U.S. PATENT DOCUMENTS

| | | | | |
|---|---|---|---|---|
| 5,321,610 A | | 6/1994 | Breslin ........................... 705/9 |
| 5,671,415 A | | 9/1997 | Hossain ....................... 717/101 |
| 5,729,746 A | | 3/1998 | Leonard ....................... 717/101 |
| 5,937,388 A | * | 8/1999 | Davis et al. .................... 705/8 |
| 5,999,911 A | * | 12/1999 | Berg et al. ....................... 705/9 |
| 6,006,193 A | * | 12/1999 | Gibson et al. |
| 6,009,405 A | * | 12/1999 | Leymann et al. |
| 6,014,673 A | * | 1/2000 | Davis et al. |
| 6,028,997 A | * | 2/2000 | Leymann et al. ........... 717/104 |
| 6,038,541 A | * | 3/2000 | Tokuda et al. ................. 705/8 |
| 6,041,306 A | * | 3/2000 | Du et al. |
| 6,052,684 A | * | 4/2000 | Du ................................ 707/8 |
| 6,065,009 A | * | 5/2000 | Leymann et al. |
| 6,078,982 A | * | 6/2000 | Du et al. |
| 6,088,679 A | * | 7/2000 | Barkley |
| 6,237,020 B1 | * | 5/2001 | Leymann et al. ........... 709/201 |
| 6,278,977 B1 | * | 8/2001 | Agrawal et al. ................ 705/7 |
| 6,308,224 B1 | * | 10/2001 | Leymann et al. ........... 709/310 |
| 6,349,320 B1 | * | 2/2002 | Emberton et al. |
| 6,415,297 B1 | * | 7/2002 | Leymann et al. |
| 6,421,691 B1 | * | 7/2002 | Kajitani ...................... 715/500 |
| 6,430,538 B1 | * | 8/2002 | Bacon et al. ................... 705/9 |
| 6,442,563 B1 | * | 8/2002 | Bacon et al. ........... 707/103 R |
| 6,442,567 B1 | * | 8/2002 | Retallick et al. ......... 707/104.1 |
| 6,502,087 B1 | * | 12/2002 | Tsuiki et al. |
| 6,505,219 B1 | * | 1/2003 | MacLean et al. ........... 715/530 |
| 6,526,388 B1 | * | 2/2003 | Sakaguchi et al. ............. 705/8 |
| 6,631,354 B1 | * | 10/2003 | Leymann et al. .............. 705/8 |

OTHER PUBLICATIONS

Template Software Inc., Workflow Template, Developing a WFT Workflow System, Chapters 1–10, Appendicies, published 1998, released 1997.*

Template Software Inc., Workflow Template, Using the WFT Development Environment, Chapters 1–9, Appendix A, published 1998, released 1997.*

"Template Software Rolls Out Corporate and Product Growth Strategies at Solutions '97 Conference", PR Newswire, Apr. 3, 1997.*

"Template Software Strengthens Core Product Family With ease–of–Use and Functional Enhancements that Promote UnParralleled Software Reuse", PR Newswire, Jun. 23, 1997.*

"Developing a WFT Workflow System", Version 8.0, Template Software Inc, whole manual, released in 1997, copyright of manual 1998.*

"IBM MQSeries Workflow Getting Started with Buildtime", version 3.1.2 IBM, Third Edition, Dec. 1998, pp. 1–119.*

* cited by examiner

*Primary Examiner*—Todd Ingberg
(74) *Attorney, Agent, or Firm*—Scully, Scott, Murphy & Presser; William E. Schiesser

(57) ABSTRACT

This invention relates to providing a flexible infrastructure for managing a process. This is done by defining a workflow type, building a workflow pointer that defines the location of a database within a network, and coding subforms for the defined workflow type. Role documents are defined and customized, process flow documents are built for the defined workflow type, and action control documents are built for determining what happens to the defined workflow type.

18 Claims, 6 Drawing Sheets

A method of providing a flexible
infrastructure for managing a process

Defining a workflow type — 12

Building a workflow pointer that defines the location of a database within a network — 14

Coding subforms for the defined workflow type — 16

Defining and customizing role documents — 20

Building process flow documents for the defined workflow type — 22

Building action control documents for determining what happens to the defined workflow type — 24

Figure 2

| A workflow type is defined | — 52

| A workflow pointer is built | — 56

| Workflow defined subforms are coded | — 62

| Defining and customizing role documents | — 64

| Building the workflow types process flow documents | — 66

| Building the actions control documents | — 72

Figure 4

FLEXIBLE INFRASTRUCTURE FOR MANAGING A PROCESS

BACKGROUND OF THE INVENTION

1. Field of the Invention

This invention generally relates to managing processes, and more specifically, the invention relates to methods and systems that provide infrastructures for managing processes.

2. Prior Art

Business applications such as Lotus Notes applications and Web applications that are interactive and collaborative are very difficult to design, code, roll-out and maintain because the businesses using them are changing as fast as the applications are built, tested and deployed. With today's dynamic customer environments, there is a great deal of cost associated with maintaining, reworking, and deploying almost daily changes in support of the customer's changing business needs.

Customers need their applications to expand dynamically in support of their ever growing customer sets on a global basis. With this comes the requirement to customize existing application workflow, defined roles, application scope and process definitions without additional application development that can impact existing customer sets. Business and application owners need centralized administrative methods for controlling their business processes in this highly distributed application environment.

SUMMARY OF THE INVENTION

An object of this invention is to provide an architecture and a methodology that provide a highly flexible infrastructure for managing any process.

Another object of the present invention is to provide a development shell that addresses the need for application owners to improve the efficiency and effectiveness of their employees through control, communication and collaboration.

A further object of this invention is to allow businesses to define current business processes while remaining flexible enough to integrate new processes dynamically as the business changes.

These and other objectives are attained with a method and system for providing a flexible infrastructure for managing a process. The method comprises the steps of defining a workflow type, building a workflow pointer that defines the location of a database within a network, and coding sub-forms for the define workflow type. Role documents are define and customized, process flow documents are built for the defined workflow type, and action control documents are built for determining what happens to the defined workflow type.

Preferably, the present invention is defined on a process model that makes it generic enough to be a scaleable architecture. The workflow model is a block model for diagramming any process. The basic model structure is based on arrows that define process inputs, outputs, controls and supports. With this basic building block, it is possible to sit with a customer and draw any business process so that it can be understood by all members of any team. With this model, both customers and providers of services can focus on any selected process box and come to agreement on the inputs and outputs of that step. The invention takes this principal and integrates it into the customer's application as a usable solution that can be implemented and/or changed as fast as it can be agreed upon.

The development shell architecture of this invention is based on the concept that many business processes are interrelated and need to communicate and share information, to have their own workflow, and to be able to integrate workflow with other application workflows and processes. These business processes also need to help owners define their processes, create new ones and integrate others, and to improve the efficiency and effectiveness of end users through control, communication and collaboration. In addition, the present invention provides a long term solution with a rapid, low cost implementation, and is open, flexible and scaleable with a building block design techniques. Also, the method and system of this invention can be administratively maintained through a single point of control, provides major development and application maintenance life-cycle savings, and provides a common methodology.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 generally outlines a method embodying this invention.

FIG. 4 illustrates a procedure for customization of a workflow.

DETAILED DESCRIPTION OF THE PREFERRED EMBODIMENTS

Figure 1:
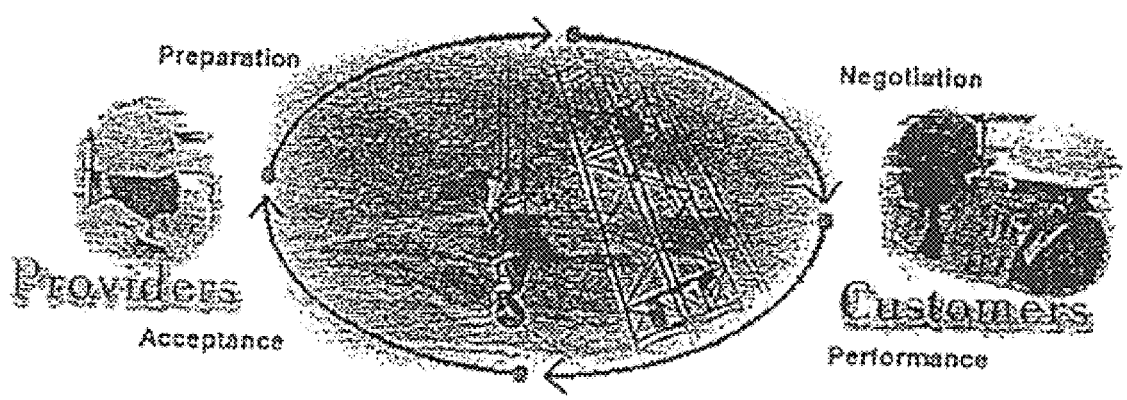
FIG. 1 diagrammatically illustrates a general workflow paradigm.

The design and functionality of the development shell of this invention is predicated on the general workflow paradigm represented in FIG. 1. In this paradigm, a workflow document is created by a submitter requesting work. The document contains the information necessary to perform that work. The document is reviewed, negotiated and/or accepted and assigned to someone to perform the work, or the request may be rejected or backlogged. The work is performed and results documented within the workflow document or in sub-documents related to the workflow document. These sub-documents may, in turn, be related to other workflow documents. A review and acceptance process may be performed and the result recorded in the workflow document.

The ability to create new workflow documents from an existing document, update any documents along a chain of related documents so as to track the status of particular work effort, and the ability to navigate among any and all related documents at any point in the workflow is necessary for efficient and effective completion of the workflow.

The above paradigm is a generic process that could be applied to many business processes. The development shell of this invention has been developed with this in mind so that application solutions are flexible and easily adapted to any business process.

FIG. 2 outlines a preferred embodiment of the present invention. With this preferred method, at steps 12, 14 and 16, a workflow type is defined, a workflow pointer is built that defines the location of a database within a network, and subforms are coded for the defined workflow type. At step 20, role documents are defined and customized; at step 22, process flow documents are built for the defined workflow type; and at step 24, action control documents are built for determining what happens to the defined workflow type.

Figure 3:
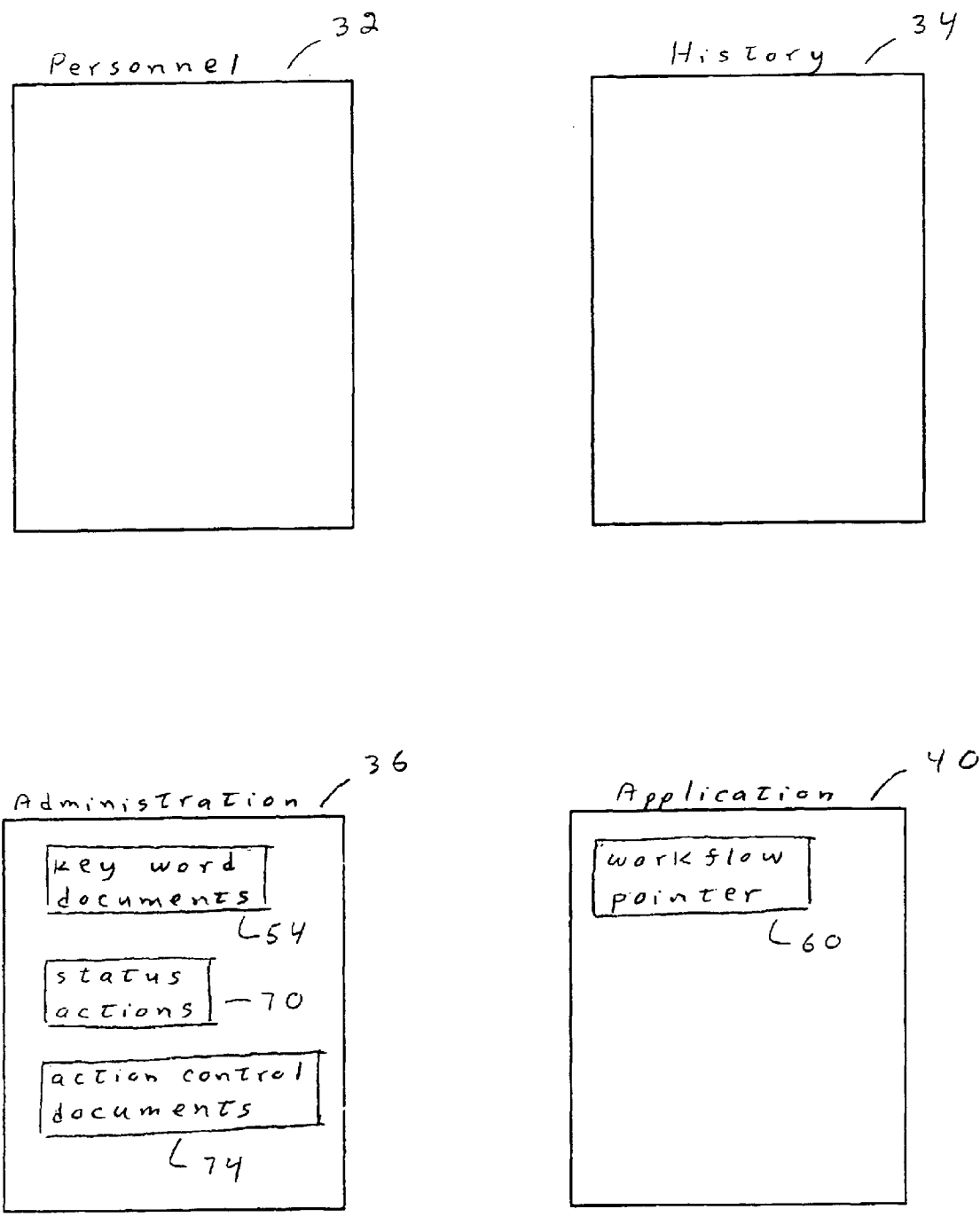
FIG. 3 schematically depicts database templates used in the preferred implementation of the present invention.

Preferably, with reference to FIG. 3, the development shell is a set of four Notes database templates. The templates are Personnel 30 (for applying names to an application), History 32 (for recording who is doing what), Administration 34 (for storing all application customizations for keywords, roles, documentation, help, actions and controls) and the Application template 36 (for maintaining and controlling the application interface). These templates may be utilized by any application as the basic foundation (architecture) for developing any workflow solution. By applying the development shell templates, an application may make use of defined features within the development shell through a process called customization. Customization means an application workflow process can be defined by building a set of documents that control how the application's workflow will function without writing any code. Coding is centered around defining the customer's application interface (subforms, dialogs, views, navigators and agents).

With reference to FIGS. 3 and 4, customization of a workflow is separated into a series of steps. At step 52, a workflow is defined. A set of keyword documents 54 is built into the administration database template 36 that uniquely identify the workflow type. These documents become the keys used throughout the application to control how the application interface works. The application interface, consisting of application defined and developed views, subforms, events, actions and agents, are all managed by the defined workflow type.

At step 56, a workflow pointer 60 is built. This is an action document that is built into the application database 40 and defines the location of the application databases within the network. These pointers are used when various development shell customized features are invoked to determine where to find the various databases for lookups, workflow processing, associating (linking and chaining workflow documents), posting (updating linked and chained documents), writing History 34 (another development template) and more (field level help, integrating application documentation, integrating personnel 32 (another development shell template)).

At step 62, workflow defined subforms are coded. Development shell workflow makes use of Notes subform design elements. The application developer builds the application specific subforms required for the defined workflow. The subforms are then displayed to the application users through the development shell main form based on the application defined workflow type. The development shell main form is what provides the base foundation for all workflow documents. Subforms are usually broken out into specific application defined process elements. Most application workflows revolve around creating and submitting a document, reviewing the submitted request and approving the document for further processing, providing a resolution to the approved request and signing off on the resolution. This implies collaboration by multiple people playing various roles at various times within a single document or across multiple related workflow document types.

Step 64 is to define and customize role documents. The developer builds a set of role definition keywords and role documents that control who does what within a workflow type or set of workflow types. These role documents allow the application to remain generic and control when a name is applied to a specific workflow document. The name is linked to the role and not the workflow document, reducing the cost of maintaining and controlling who can do what within a specific workflow type and when they can do it. A workflow type can be rolled out to multiple varied groups and organizations by building additional role documents in support of them. It is these role documents, when applied to an application, that allow the separation of responsibility within a single application instance without the need for utilizing reader and author name fields (these fields drastically reduce the performance of any database).

Step 66 is to build the workflow types process flow documents. A set of customized documents called status actions 70 are built within the administration database template 36. These status action documents are used by the defined workflow type to determine what action a given user may perform within a given workflow document. Control is based on the workflow type, the current status of the workflow document and the role or document fields containing the user's name. Actions are invoked when a user presses the default workflow action button or through application defined fields, buttons, events and/or agents.

Step 72 is to build the actions control documents 74. A set of action control documents that determine what happens to a defined workflow type is built in the administration database template 36. The action control document run is defined by the status action document. When a user takes a particular status action, the defined action control document is processed by the development shell. The action control document defines what fields are validated (applications do not need to code this in fields), what pre and post confirmations are presented, what fields are updated (within the workflow type or another defined workflow type) and what mail is to be sent and to whom. Field updates include, but are not limited to, stuffing a value from one field into another field, looking up data and presenting it to the user, stuffing looked up roles into fields, arithmetic and if-then-else logic, posting, getting and posting, executing most notes functions, displaying application defined dialogs, and building up or downstream documents. Many other types of field updates may also be used in the practice of this invention.

An important aspect of the invention is its ability to provide generic workflow features and the ability to customize them, along with the type and variety of functions. Any application workflow can be defined, managed and controlled through a generic set of development shell agents that manage and control an application. The customized action and control documents are generic enough that they can be built to control how an application will process. This solution encompasses security, control, collaboration, communication and connectivity for Notes and Domino (Web) applications through a centrally administered single-point-of-control. Because the workflow is managed in the administration database 36 as documents, the applications workflow can literally be modified without changing any code.

Figure 5:
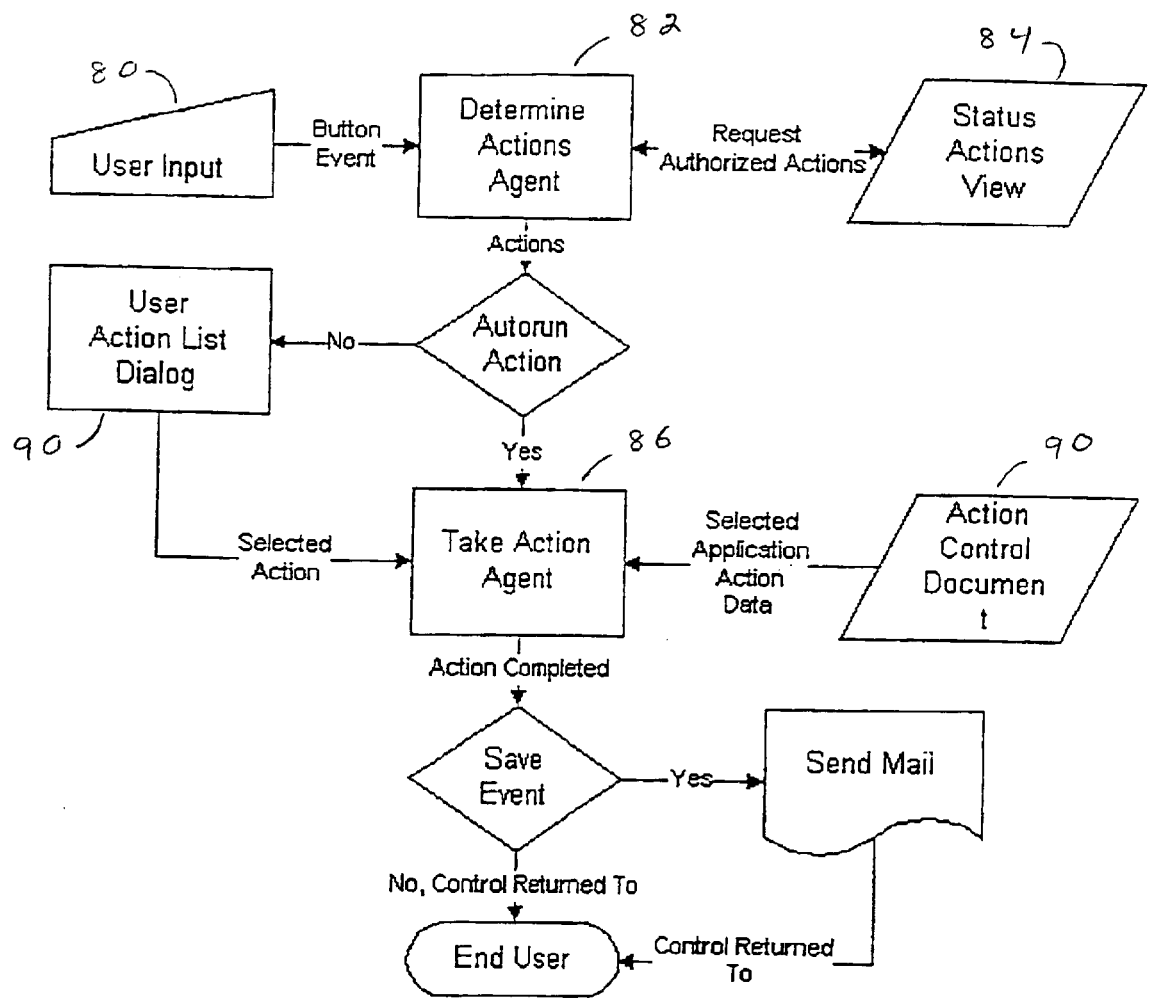
FIG. 5 shows a work flow feature.

Basic components of the development shell workflow features are illustrated in FIG. 5. As represented at 80, users of a development shell defined application interface with the workflow feature through application defined events, buttons or by utilizing the default development shell WorkFlow Actions button. The development shell Determine Actions Agent 82 gains control and queries the Administration databases Status Actions View 84 to determine what actions the user is authorized to take. Authorization is based on the workflow document type, the current status of the workflow document and the authorizations allowed for the selected actions. The result of the query is a list of authorized actions for that user.

If Determine Actions was invoked as auto-run, then control is routed to the Take Action Agent 86 to process the action control document associated with the application defined auto-run event. Otherwise, the development shell default dialog 90 is displayed and the user is presented with a list of actions they may pick. Once the user selects an action, control is routed to the Take Action Agent 86. This agent processes the selected action control document and returns control to the end user.

Figure 6:
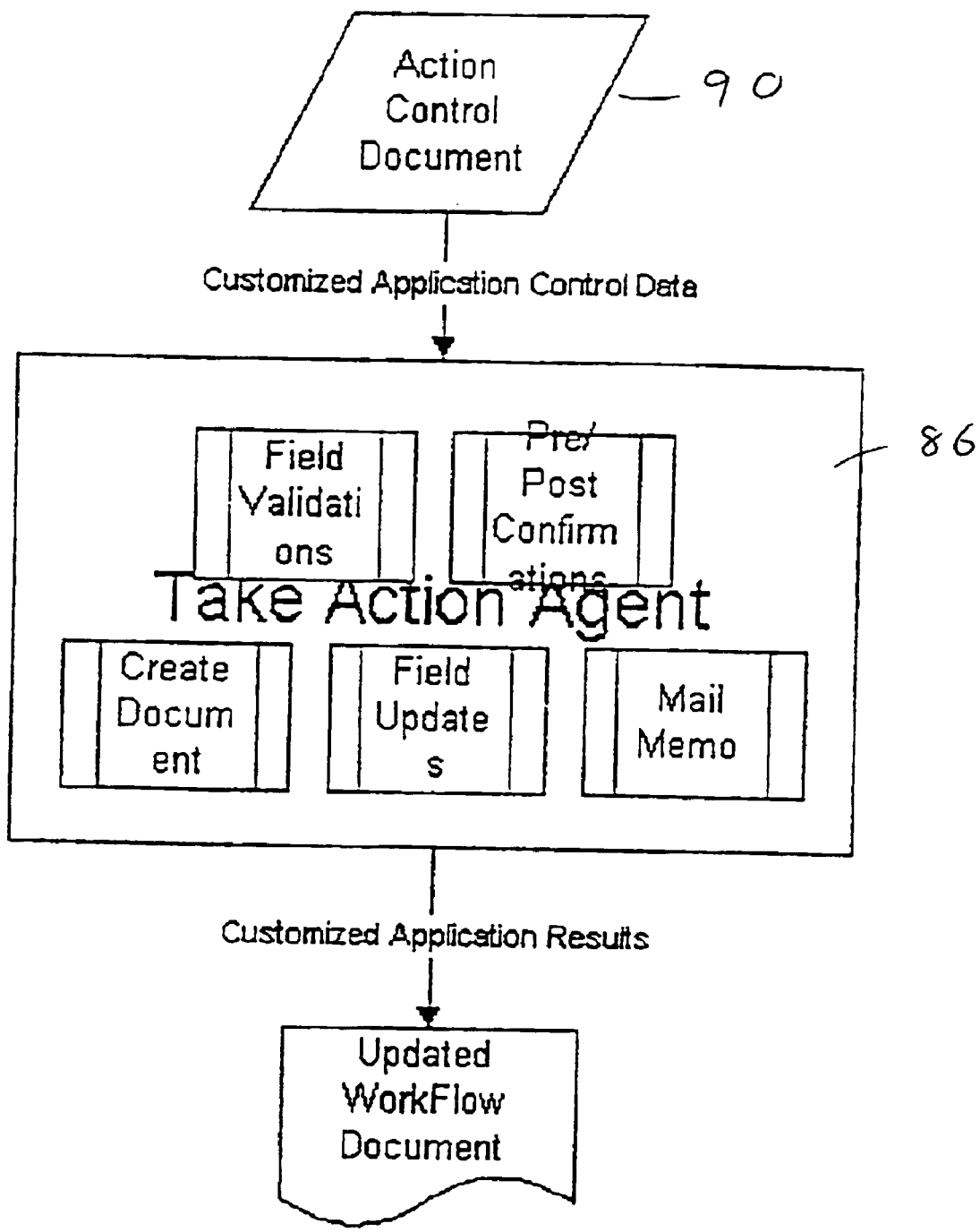
FIG. 6 illustrates the processing of an action control document.

FIG. 6 shows the high level inner working principals of how the development shell Take Action Agent processes an Action Control Document 90 that was selected by an end user for any given Action. The Action Control Document contains the customized data from an application for a given action. These data are processed by the Take Action Agent, and control is returned to the end user when the agent completes. Various functions that any given Action Control Document might do (as defined by the application) are: workflow document field validations; pre and post confirmation messages; creation of new workflow documents; field updates into the current workflow document or other associated workflow documents within the application or cross applications and servers, if so authorized; building of a mail memo that would be sent on the workflow document save event; and processing of additional Action Control Documents with optional branching logic.

The preferred embodiment of the invention, as described above in detail, has a number of important advantages. For instance, the invention may be used to achieve the client's objectives of tracking and controlling a business process. The invention may be used to improve efficiency and effectiveness by presenting a common look and feel throughout the application for workflow features and providing the ability to navigate easily between related documents. Also, this invention reduces database maintenance and development effort by utilizing administrative documents for defining keywords and for controlling the workflow process, functionality, roles and more. In addition, the invention provides a generic design that is flexible and can be customized easily to support any business process requiring tracking and control. This invention can be used with many types of business architectures, including Lotus Notes, Domino, and Web platforms.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of providing a flexible infrastructure for managing a process, comprising:
    defining a workflow type;
    building a workflow pointer that defines the location of a database within a network, said database including a set of database templates, and said database template including defined features;
    coding subforms for the defined workflow type;
    displaying the subforms to application users;
    accessing the database templates to build a set of documents, including
        i) defining and customizing role documents,
        ii) building process flow documents for the defined workflow type, and
        iii) building action control documents for determining what happens to the defined workflow type; and
    running a set of agents to generate files that map application defined workflows into pages and actions that can be called and execute; and
    wherein the method is administratively maintained through a single point of control.

2. A method according to claim 1, wherein the step of defining the workflow type includes the step of building a set of keyword documents into the database that uniquely identify the workflow type.

3. A method according to claim 1, wherein the step of defining and customizing role documents includes the step of building a set of role definition keywords and role documents that control the workflow type.

4. A method according to claim 1, wherein the defined workflow type uses the process flow documents to determine what action a given user may perform within a given workflow document.

5. A method according to claim 1, wherein the action control document run is defined by the process flow documents.

6. A method according to claim 1, comprising the further steps of:
    a user accessing a development shell; and
    the development shell then using a Determine Action Agent to gain control and to query a Status Action View to determine what actions the user is authorized to take.

7. A method according to claim 6, comprising the further steps of:
    the user selecting one of said actions;
    routing control to a Take Action Agent; and
    using the Take Action Agent to process the selected action and return control to the user.

8. A method according to claim 7, for modifying a given workflow having computer code, and wherein the role documents, the process flow documents and the action control documents enable the given workflow to be modified without changing any of the code.

9. A system for providing a flexible infrastructure for managing a process, comprising:
    means for defining a workflow type;
    a database including a set of database templates, said database templates including defined features;
    means for building a workflow pointer that defines the location of the database within a network;
    means for coding subforms for the defined workflow type;
    means for displaying the subforms to application users;
    means for accessing the database templates to build a set of documents, including
        i) means for defining and customizing role documents,
        ii) means for building process flow documents for the defined workflow type, and
        iii) means for building action control documents for determining what happens to the defined workflow type; and
    means for running a set of agents to generate files that map application defined workflows into pages and actions that can be called and executed; and
    wherein the system is administratively maintained through a single point of control.

10. A system according to claim 9, wherein the means for defining the workflow type includes means for building a set of keyword documents into the database that uniquely identify the workflow type.

11. A system according to claim 9, wherein the means for defining and customizing role documents includes means for building a set of role definition keywords and role documents that control the workflow type.

12. A system according to claim 9, wherein the defined workflow type uses the process flow documents to determine what action a given user may perform within a given workflow document.

13. A system according to claim 9, wherein the action control document run is defined by the process flow documents.

14. A program storage device readable by machine and tangibly embodying a set of instructions for the machine to perform method steps for providing a flexible infrastructure for managing a process, said method steps comprising:

defining a workflow type;

building a workflow pointer that defines the location of a database within a network, said database including a set of database templates, and said database templates including defined features;

coding subforms for the defined workflow type;

displaying the subforms to application users;

accessing the database templates to build a set of documents, including
    i) defining and customizing role documents;
    ii) building process flow documents for the defined workflow type, and
    iii) building action control documents for determining what happens to the defined workflow type; and running a set of agents to generate files that map application defined workflows into pages and actions that can be called and executed; and wherein the method steps are administratively maintained through a single point of control.

15. A program storage device according to claim 14, wherein the step of defining the workflow type includes the step of building a set of keyword documents into the database that uniquely identify the workflow type.

16. A program storage device according to claim 14, wherein the step of defining and customizing role documents includes the step of building a set of role definition keywords and role documents that control the workflow type.

17. A program storage device according to claim 14, wherein the defined workflow type uses the process flow documents to determine what action a given user may perform within a given workflow document.

18. A program storage device according to claim 14, wherein the action control document run is defined by the process flow documents.

* * * * *